Aug. 12, 1930.  H. F. WILSON  1,772,738
STRAINER SUPPORT FOR CREAM SEPARATORS
Filed Feb. 13, 1930   2 Sheets-Sheet 1
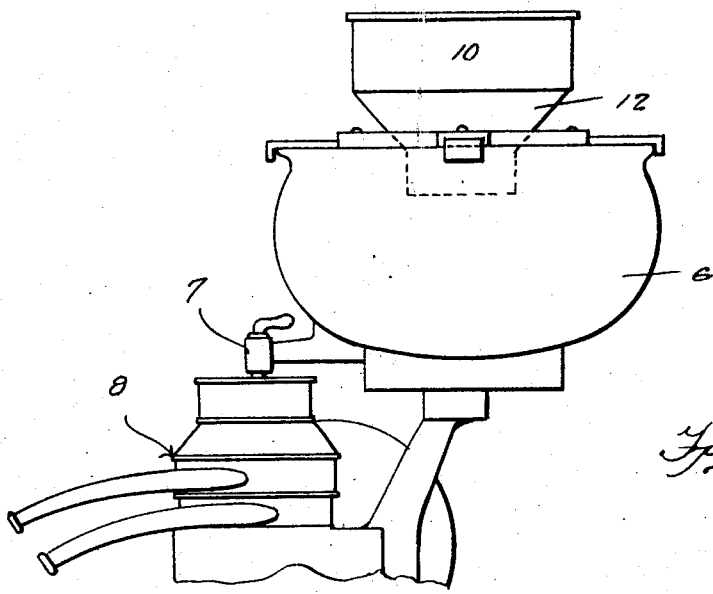
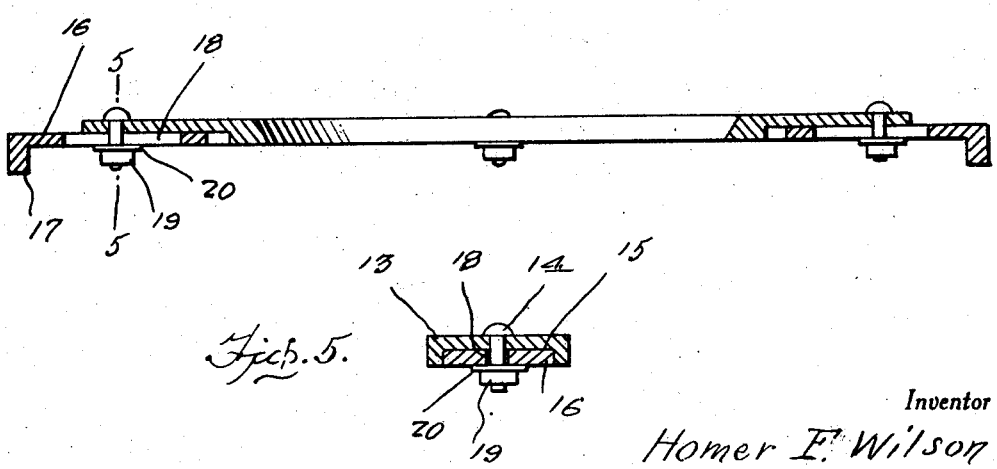
Inventor
Homer F. Wilson
By [signature]
Attorney

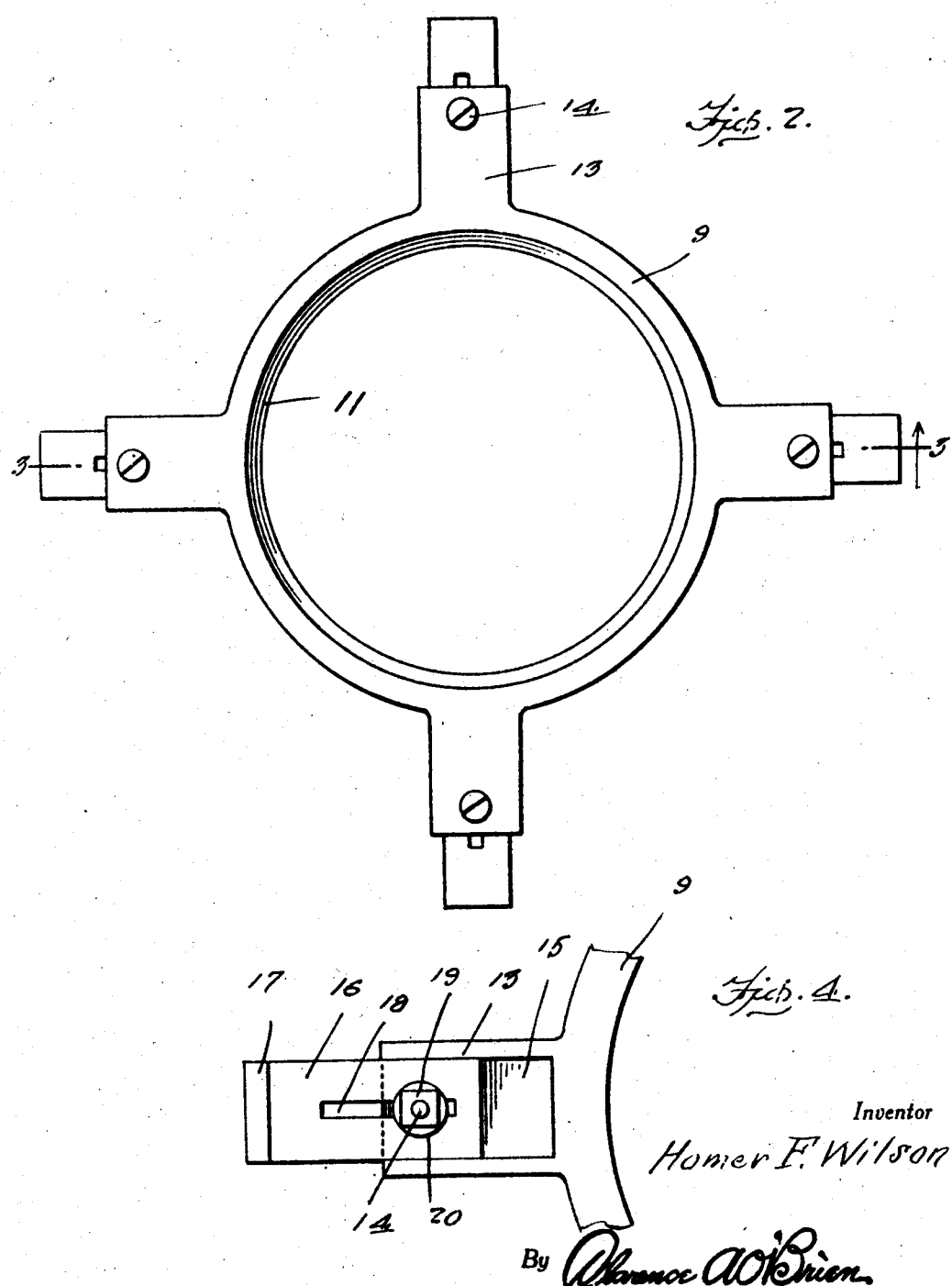

Patented Aug. 12, 1930

1,772,738

UNITED STATES PATENT OFFICE

HOMER F. WILSON, OF SYLVIA, KANSAS

STRAINER SUPPORT FOR CREAM SEPARATORS

Application filed February 13, 1930. Serial No. 428,099.

This invention relates to strainer supports and is particularly adaptable for supporting strainers above the separator bowl.

An object of the invention is to provide a strainer support of the character referred to that will support the strainer while the operator is pouring the milk into the separator bowl, without requiring a second person to aid in the operation.

A further feature of the invention is to provide a strainer support that is adapted to molds of varying diameter, and to further provide a support that holds the strainer in rigid upright position.

With the foregoing other objects of the invention are to provide a strainer support of the character referred to that is strong, compact and durable, thoroughly reliable for its intended purpose, very simple in its method of assembly, easy to manipulate and comparatively inexpensive to manufacture and install.

With the foregoing other objects of the invention are that the same consists of a novel construction, combination and arrangement of parts, which will be hereinafter more specifically described and illustrated in the accompanying drawings, wherein is disclosed an embodiment of the invention, but it is to be understood that changes, variations and modifications, may be resorted to without departing from the spirit of the claim hereto appended.

In the drawings, wherein corresponding reference characters denote corresponding parts throughout the several views:—

Figure 1 is a fragmentary side elevation of a cream separator showing the support of the present invention applied thereto, Fig. 2 is a top plan view of the strainer, Fig. 3 is a section taken substantially on the line 3—3 of Fig. 2, Fig. 4 is a fragmentary bottom plan view thereof, Fig. 5 is a vertical section in detail taken substantially on the line 5—5 of Fig. 3.

Referring to the drawings, in detail, 6 indicates the bowl or receptacle into which the milk or cream is poured in the beginning of the separating operation. Leading from the bowl is a spigot 7 that forms an outlet from the bowl, into the separating mechanism, indicated generally at 8.

Support in accordance with the present invention consists of a metal ring 9 of suitable thickness, the interior diameter of which is such as to receive the strainer or funnel 10. The inner periphery of the ring 9 is beveled as at 11 so as to accommodate the flared neck 12 customarily found on strainers or funnels.

Projecting laterally from the outer periphery of the ring 9 are four arms 13 preferably spaced at quadrant from each other. Adjacent every outer end of a depending arm 13 is an opening through which extends the bolts 14. The inner face of each arm 13 is adapted with channels 15 that slidably receives tongues 16. On the outer ends of these tongues are flanges 17 that overlap the upper edges of the bowl 6 for rigidly securing a support to the bowl.

Intermediate the ends of each tongue there are longitudinal slots 18 through which extend the shanks of the bolts 14. The threaded ends of the bolts 14 projects below the slot 18 and have nuts 19 threaded thereon and engaging with washers 20 for locking the tongues 16 in any suitable position.

The ring 9 is flat on its upper and lower faces and the arms 13 are the same thickness as the rings. The upper face of the lugs extend from the rings in the same plane as the upper face thereof. The channel 15 in each arm 13 is countersunk with respect to the lower face of the rings 9. The slot 18 is disposed intermediate the ends of the tongues 16 throughout the major portion of the length of these tongues. These adjustable tongues provide for securing the support in accordance with the present invention on separator bowls, in varying diameters.

The present embodiment of the invention has been disclosed in considerable detail merely for the purpose of exemplification since in actual practice it attains the features of advantage enumerated as desirable in the statement of the invention and the above description.

It is to be understood that by describing in detail herein any particular form, structure, or arrangement, it is not intended to limit the invention beyond the terms of the claim, or the requirements of the prior art.

Having thus described my invention, what I claim as new is:

A strainer support for separator bowls comprising a metallic ring having at its inner periphery a beveled seat integral with said ring, arms extending radially therefrom, said arms having channels in their under faces thereof, lapped tongues slidable in said channels, said tongues having intermediate longitudinal slots, depending flanges on the ends of the tongues and bolts extending through the arms and slots in the tongues for locking said support against the separator bowl.

In testimony whereof I affix my signature.

HOMER F. WILSON.